W. A. LAWREY.
DRAG SAW.
APPLICATION FILED MAR. 26, 1909.
947,182.
Patented Jan. 18, 1910.
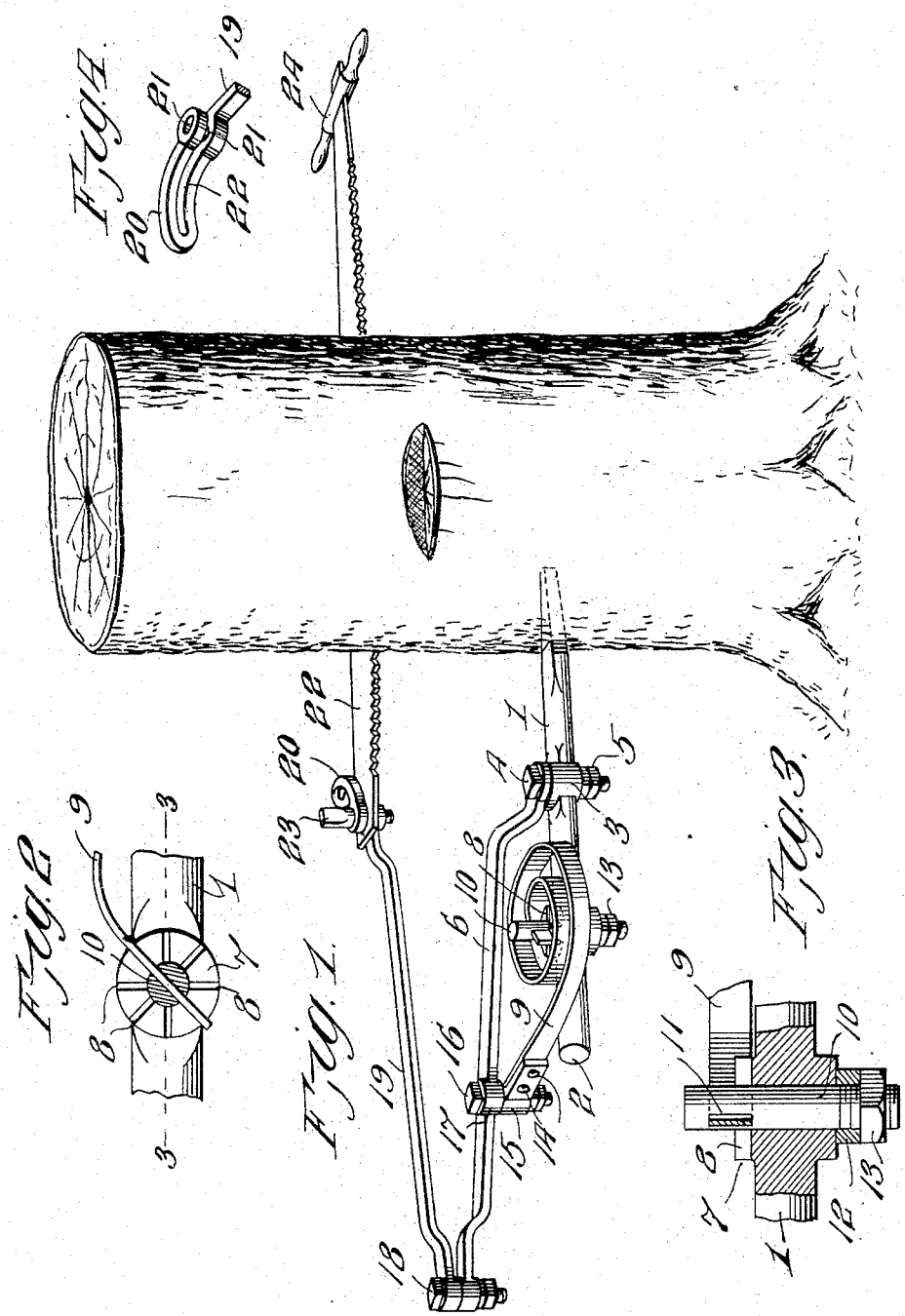
Witnesses
Frank Hough
Inventor
Willis A. Lawrey,
By Victor J. Evans
Attorney

UNITED STATES PATENT OFFICE.

WILLIS A. LAWREY, OF DUDLEY, IDAHO.

DRAG-SAW.

947,182.  Specification of Letters Patent. Patented Jan. 18, 1910.

Application filed March 26, 1909. Serial No. 485,966.

*To all whom it may concern:*

Be it known that I, WILLIS A. LAWREY, a citizen of the United States of America, residing at Dudley, in the county of Kootenai and State of Idaho, have invented new and useful Improvements in Drag - Saws, of which the following is a specification.

This invention relates to drag saws designed for the purpose of sawing through the trunk of a tree to permit the tree to fall, and one of the principal objects of the invention is to provide a simple device to be attached to the tree and connected to one end of a cross cut saw for holding the saw in proper position to be operated by one man.

Another object of the invention is to provide a spring actuated device to be connected to a saw for pulling it in one direction so that the operator at the opposite end of the saw is only required to pull the saw against the tension of the spring.

Still another object of the invention is to provide a simple device to be attached to a tree to carry the outer end of a cross cut saw when in use, allowing no flop, sag or bind to the saw.

Still another object of the invention is to provide a simple device to saw a log from the underside when it is necessary for the operator to do so.

These and other objects may be attained by means of the construction illustrated in the accompanying drawing, in which,—

Figure 1 is a perspective view of a drag saw made in accordance with my invention and shown connected to the stump of a tree in position for use. Fig. 2 is a detail plan view of the device for adjusting the tension of the spring. Fig. 3 is a sectional view on the line 3—3 of Fig. 2. Fig. 4 is a detail perspective view of the slotted end of the connecting bar to which the saw is attached at one end.

A supporting member is provided consisting of a sharp-pointed metallic peg or stake 1 having a plain outer end 2 to enable said stake or supporting member to be conveniently driven into the trunk of a tree, as shown in Fig. 1. Formed on said stake is a boss 3 through which a bolt hole extends, and connected to said boss by means of a bolt 4 and nuts 5 is an arm 6. Formed upon the stake 1 intermediate the boss 3 and the plain outer end 2 is an annular boss 7 provided with a central bolt hole and with radial grooves 8 extending from the bolt hole to the periphery of said boss. A convolute spring 9 is secured at one of its ends to the boss 7, as shown in Fig. 2, by means of a winding post consisting of a bolt 10 having a slot 11 for the passage of the end of the spring 9 which, being passed through said slot, is held in one of the radial grooves 8 of the boss. By turning the bolt 10 the tension of the spring 9 may be regulated in an obvious manner. The bolt 10 is provided with a nut 12 and a jam nut 13 by means of which the end of the spring 9 may be firmly clamped to the boss 7 and adjusted as to its tension.

Secured upon the outer end of the spring 9 by fastening members, such as rivets 14, is a collar 15 for the passage of a bolt 16, whereby said collar at the end of the spring 9 is pivotally connected with the arm 6, which latter is provided intermediate its ends with an apertured boss 17 for the passage of the bolt or pivotal connecting member 16.

Pivotally connected with the outer or free end of the arm 6 by means of a pin or bolt 18 is one end of a link 19, the opposite end of which is curved, as shown at 20, and provided with a longitudinal slot 22, the latter being intersected by alined bolt apertures 21. The saw blade 22 is pivotally mounted upon a pin or bolt 23 extending through the apertures 21, said saw blade being guided when the machine is in operation by the curved and slotted extension of the link 19. The saw blade is provided at its outer extremity with a handle 24.

It will be observed that in the drawing hereto annexed the saw blade has been shown as being supported for movement in an approximately horizontal plane, one of the special advantages of this invention being the facility with which it may be utilized for the purpose of felling trees; but it is equally obvious that the device may readily be utilized to support the saw for movement in an approximately vertical or inclined plane, for the purpose of sawing tree trunks lying upon the ground or for similar purposes by simply adjusting the supporting member to present the saw blade in the desired direction. It will be observed that the arm 6 and the link 19 are bent or offset intermediate their ends so as to clear the pivotal supporting members and the winding post of the spring.

The operation of this invention and its advantages will be readily understood from the foregoing description taken in connection with the drawing hereto annexed. The stake or supporting member 1 is driven firmly into the trunk of the tree or the piece of timber that is to be sawed, and the tension of the spring is adjusted to give the requisite pull upon the saw. The operator, grasping the handle 24 of the saw, pulls the latter toward him in the usual manner, the reverse movement being greatly facilitated by the tension of the spring.

The invention is simple in construction; it may be quickly arranged in position for operation, and it is thoroughly efficient in use.

I claim:—

1. In a device of the character described, a supporting member consisting of a sharp-pointed stake having a plain blunt outer end, an arm pivotally mounted upon the stake, a winding post extending through the supporting member intermediate the pivoted arm and the blunt outer end, a spring connected at one end with the winding post, means for pivotally connecting the other end of said spring with the pivoted arm, a link pivotally connected with the arm, and a saw pivotally connected with and carried by the link.

2. A supporting member, an arm pivoted thereon, a winding post extending through the supporting member, a spring connected with and wound upon the post, means for pivotally connecting the end of the spring with the pivoted arm, a link connected pivotally with said arm and having a curved and slotted outer end, and a saw blade pivotally connected with said link and guided and supported by the curved slotted portion of said link.

3. A supporting member having an apertured boss provided with radial grooves, a winding post consisting of a slotted bolt extending through the aperture and having tightening nuts, an arm pivoted upon the supporting member, a spring having one end extended through the slotted bolt in engagement with a radial groove and having its other end pivotally connected with the pivotally supported arm, a link pivotally connected to said arm, and a saw pivotally connected with and supported by said link.

In testimony whereof I affix my signature in presence of two witnesses.

WILLIS A. LAWREY.

Witnesses:
 FRED. G. DUDLEY,
 NATHAN W. ROSS.